US010921342B2

(12) United States Patent
Wu et al.

(10) Patent No.: US 10,921,342 B2
(45) Date of Patent: Feb. 16, 2021

(54) ARM SWING COMPENSATION TECHNIQUES

(71) Applicant: QUALCOMM Incorporated, San Diego, CA (US)

(72) Inventors: Jie Wu, San Diego, CA (US); William James Morrison, San Francisco, CA (US); Dominic Gerard Farmer, Los Gatos, CA (US); Benjamin Werner, Sunnyvale, CA (US); Joseph Czompo, San Jose, CA (US)

(73) Assignee: QUALCOMM Incorporated, San Diego, CA (US)

(*) Notice: Subject to any disclaimer, the term of this patent is extended or adjusted under 35 U.S.C. 154(b) by 577 days.

(21) Appl. No.: 14/842,349

(22) Filed: Sep. 1, 2015

(65) Prior Publication Data
US 2016/0274139 A1 Sep. 22, 2016

Related U.S. Application Data

(60) Provisional application No. 62/136,219, filed on Mar. 20, 2015.

(51) Int. Cl.
*G01P 3/50* (2006.01)
*G01S 19/19* (2010.01)
(Continued)

(52) U.S. Cl.
CPC ............ *G01P 3/50* (2013.01); *G01S 19/19* (2013.01); *G01S 19/42* (2013.01); *G01S 19/52* (2013.01); *G01S 19/34* (2013.01)

(58) Field of Classification Search
None
See application file for complete search history.

(56) References Cited

U.S. PATENT DOCUMENTS 5,926,131 A * 7/1999 Sakumoto ............... G01S 19/34
342/357.52
6,285,314 B1 9/2001 Nagatsuma et al.
(Continued)

FOREIGN PATENT DOCUMENTS

CN 103354728 A 10/2013

OTHER PUBLICATIONS

International Preliminary Report on Patentability—PCT/US2016/018223—European Patent Office—Munich, Germany—dated Mar. 10, 2017—25 pgs.
(Continued)

*Primary Examiner* — Shaun M Campbell
*Assistant Examiner* — Aneta B Cieslewicz
(74) *Attorney, Agent, or Firm* — Hunter Clark PLLC

(57) ABSTRACT

Techniques are provided which may be implemented using various methods and/or apparatuses in a mobile GNSS device to compensate for arm swing. An example of an method for compensating for arm swing according to the disclosure includes determining an arm swing signal, such that the arm swing signal is approximately sinusoidal with a period of approximately T seconds, determining a position signal measurement period, receiving a plurality of positioning signals at intervals corresponding to the position signal measurement period, and determining current position information based on the plurality of positioning signals.

16 Claims, 10 Drawing Sheets

(51) Int. Cl.
  *G01S 19/52* (2010.01)
  *G01S 19/42* (2010.01)
  *G01S 19/34* (2010.01)

(56) References Cited

U.S. PATENT DOCUMENTS

| | | |
|---|---|---|
| 6,532,432 B1 | 3/2003 | Nagatsuma et al. |
| 2013/0191034 A1 | 7/2013 | Weast et al. |
| 2013/0328726 A1 | 12/2013 | Riley et al. |
| 2014/0180621 A1 | 6/2014 | Poduri et al. |
| 2014/0257766 A1 | 9/2014 | Poduri et al. |
| 2014/0365169 A1 | 12/2014 | Pham |
| 2015/0088408 A1 | 3/2015 | Yamaoka |
| 2015/0120022 A1 | 4/2015 | Aoki et al. |

OTHER PUBLICATIONS

International Search Report and Written Opinion—PCT/US2016/018223—ISA/EPO—dated Jun. 7, 2016—13 pgs.
Zi-Li J., et al., "Research Advancement on the use of Resisted and Assisted Training Methods for Speed Development", Journal of Shandong Sport University, vol. 31, No. 6, Dec. 2015, pp. 96-101.

\* cited by examiner

| Arm Swing Period T (secs) | N | K | Position Measurement Period (secs) |
|---|---|---|---|
| 0.5 | 2 | 6 | 1.083 |
| 0.8 | 1 | 4 | 1.000 |
| 0.9 | 1 | 6 | 1.050 |
| 1.0 | 1 | 6 | 1.1667 |
| 1.1 | 1 | -6 | 0.9167 |
| 1.3 | 1 | -4 | 0.9750 |
| 1.4 | 1 | -4 | 1.050 |
| 1.7 | 1 | -4 | 1.275 |
| 2.0 | 1 | -2 | 1.000 |

ARM SWING COMPENSATION TECHNIQUES

CROSS-REFERENCE TO RELATED APPLICATIONS

This application claims the benefit of U.S. Provisional Application No. 62/136,219, entitled "Arm Swing Compensation Techniques," filed on Mar. 20, 2015, which is assigned to the assignee hereof and the contents of which are incorporated herein by reference in their entirety.

BACKGROUND

Global Navigation Satellite System (GNSS) receivers have been incorporated into a multitude of devices, including mobile devices such as mobile phones, wrist watches, and other portable devices. Many small mobile devices are configured to be worn by a user and may make use of GNSS signals to provide for positioning information. Such mobile devices often face power constraints due to the limited size of the on-board batteries. GNSS positioning methods can have a significant impact on battery life of a mobile device. For example, in a conventional GNSS receiver, navigation is performed to achieve a required accuracy and the power consumption associated with the GNSS receiver is optimized to provide the required accuracy. A GNSS receiver may cycle between a stand-by mode and a receive mode as part of the optimization. However, this approach is suboptimal in situations where the mobile device is moving relative to the user, such as when a user is running/walking with a mobile device on their arm and the user's arms are swinging. The relative motion, in combination with the periodic GNSS signal reception, may lead to errors in the calculated position information. For example, the relative motion may create an undetectable bias in velocity calculations.

SUMMARY

An example method of determining a velocity of a user with a mobile device according to the disclosure includes determining an arm swing signal with the mobile device worn by the user, such that the arm swing signal includes an arm swing signal oscillation period of approximately T seconds, determining a position signal measurement period, such that the position signal measurement period is not equal to T seconds, receiving a plurality of positioning signals at an interval corresponding to the position signal measurement period, and determining the velocity of the user based on the plurality of positioning signals.

Implementations of such a method may include one or more of the following features. A foot fall rate may be determined, such that the arm swing signal is based on the foot fall rate. The arm swing signal oscillation period T may be equal to half the foot fall rate. The plurality of positioning signals may be satellite positioning signals (SPS). The position signal measurement period does not need to be a constant value.

An example method of determining a velocity of a user with a mobile device according to the disclosure includes determining an arm swing signal, such that the arm swing signal is approximately sinusoidal with a period of approximately T seconds, determining a position signal measurement period, such that position signal measurements corresponds to at least a pair of complementary values of the arm swing signal, receiving a plurality of positioning signals at intervals corresponding to the position signal measurement period, and determining a current position information based on the plurality of positioning signals.

Implementations of such a method may include one or more of the following features. The arm swing signal may be based on a foot fall rate. Receiving the plurality of positioning signals may include receiving satellite positioning system signals (SPS). The pair of complementary values may include a first value and a second value, such that a space between the first value and the second value is an odd multiple of 180 degrees. The arm swing signal and the position signal measurement period may be determined periodically. The position signal measurement period may be based on a Dynamic Power Optimization (DPO) algorithm. The position signal measurement period may be between 0.9 seconds and 1.3 seconds. The position signal measurement period may be equal to (N*T)+(T/K), such that N may be a non-negative integer and K may be an even positive or negative integer.

An example of an apparatus according to the disclosure includes means for determining an arm swing signal, such that the arm swing signal is approximately sinusoidal with a period of approximately T seconds, means for determining a position signal measurement period, such that position signal measurements corresponds to at least a pair of complementary values of the arm swing signal, means for receiving a plurality of positioning signals at intervals corresponding to the position signal measurement period, and means for determining a current position information based on the plurality of positioning signals.

Implementations of such an apparatus may include one or more of the following features. Means for determining a foot fall rate, such that the arm swing signal is based at least in part of the foot fall rate. The means for receiving the plurality of positioning signals may include means for receiving satellite positioning system signals (SPS). The at least a pair of complementary values may include a first value and a second value, such that a space between the first value and the second value is an odd multiple of 180 degrees. The arm swing signal and the position signal measurement period may be determined periodically. The position signal measurement period may be based on a Dynamic Power Optimization (DPO) algorithm. The position measurement period by be between 0.9 and 1.3 seconds. The position signal measurement period may be equal to (N*T)+(T/K), such that N may be a non-negative integer and K may be an even positive or negative integer.

An example of a mobile device according to the disclosure includes a memory unit, a sensor configured to detect an arm swing motion, and one or more processing units operably coupled to the memory unit and configured to determine an arm swing period (T), set an N value equal to 1 and a K value equal to 2, calculate a position measurement period (MP) value equal to (N*T)+(T/K), store the MP value in memory if the MP value is between a t1 value and t2 value, and iterate the MP value calculation by modifying the N value and/or the K value, such that the N value may be a non-negative integer and the K value may be a positive or negative even integer if the MP value is not between the t1 value and the t2 value.

Implementations of such a mobile device may include one or more of the following features. A GNSS receiver, such that the one or more processing units are configured to acquire position signals at an interval equal to the MP value stored in memory. A velocity of the mobile device may be based on the position signals acquired at two or more intervals. The sensor configured to detect the arm swing motion may include one or more accelerometers. The sensor configured to detect the arm swing motion may be configured to detect a foot fall rate, and the one or more processing units may be configured to determine the arm swing period (T) as the foot fall rate divided by 2. The one or more processing units may be configured to determine the arm swing period (T) and store a corresponding MP value periodically. The t1 value may be 0.9 and the t2 value may be 1.3.

An example of a non-transitory processor-readable storage medium comprising instructions for determining a velocity of a user with a mobile device according to the disclosure include code for determining an arm swing period (T), code for setting an N value equal to 1 and a K value equal to 2, code for calculating a position measurement period (MP) value equal to (N*T)+(T/K), code for storing the MP value in memory if the MP value is between a t1 value and t2 value, and code for iterating the MP calculation by modifying the N value or the K value, such that the N value is a non-negative integer and the K value is a positive or negative even integer if the MP value is not between the t1 value and the t2 value.

Implementations of such a non-transitory processor-readable storage medium may include one or more of the following features. Code for acquiring position signals in a GNSS receiver at an interval equal to the MP value stored in memory. Code for determining the velocity of the mobile device based on the position signals acquired at two or more intervals. Code for determining the arm swing period (T) based on one or more accelerometers. Code for detecting a foot fall rate and determining the arm swing period (T) as the foot fall rate divided by 2. Code for periodically determining and storing the arm swing period (T). The t1 value may 0.9 seconds and the t2 value may be 1.3 seconds.

Items and/or techniques described herein may provide one or more of the following capabilities, and/or other capabilities not mentioned. A mobile device configured to receive positioning signals is worn by a user. A rate of the user's foot falls may be determined. An arm swing period is determined. A positioning signal measurement period is calculated based at least in part on the arm swing period. Positioning signals are received and current position information is determined. The position information may be stored. A velocity bias vector may be determined. Other capabilities may be provided and not every implementation according to the disclosure must provide any, let alone all, of the capabilities discussed.

BRIEF DESCRIPTION OF DRAWINGS

Non-limiting and non-exhaustive aspects are described with reference to the following figures, wherein like reference numerals refer to like parts throughout the various figures unless otherwise specified.

DETAILED DESCRIPTION

Some example techniques are presented herein which may be implemented in various method and apparatuses in a mobile device to possibly provide for or otherwise support arm swing compensation techniques in a mobile device.

For example, in certain implementations, a mobile device is worn on the arm of a user. The position of the mobile device oscillates relative to the user (e.g., swings back and forth). An arm swing period is determined. The mobile device calculates position information based on received signals. The position information received may be received at a periodic rate based on power requirements. The relative motion of the arm swing may create velocity bias in computed position information. The velocity bias may be difficult to filter if the rate in which the position information is received is approximately equal to the arm swing period. A position signal measurement rate is calculated such that it does not equal the arm swing period. The position signal measurement rate may be in pairs of 180 degree phases within a few arm swing cycles. The period position signal measurements reduce the velocity bias associated with an arm swing.

Figure 1:
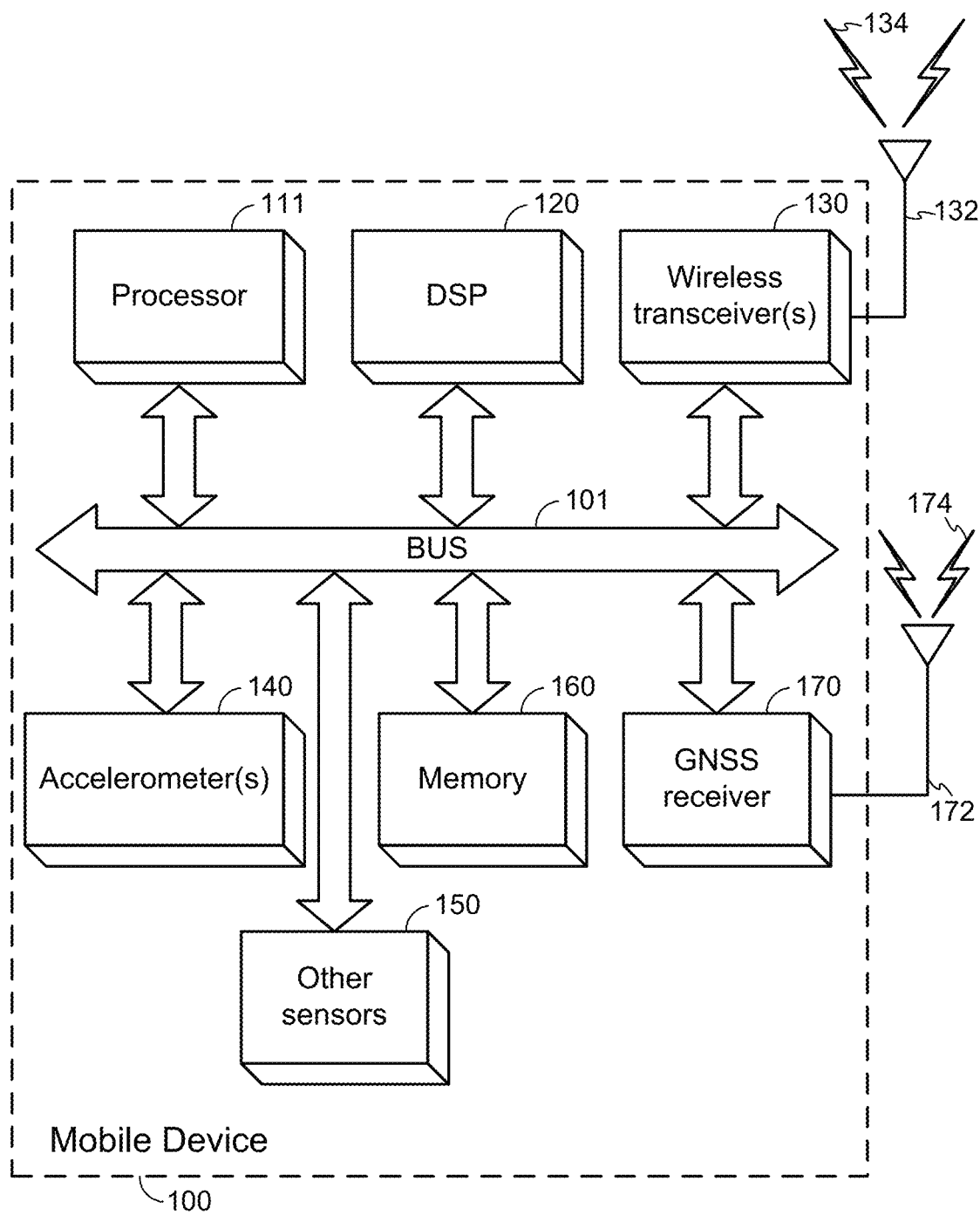
FIG. 1 is a block diagram of a mobile device that can be used to implement the techniques discussed herein.

Referring to FIG. 1, a block diagram of a mobile device 100 that can be used to implement arm swing compensation techniques is show. The mobile device 100 can include or implement the functionality of various mobile communication and/or computing devices; examples include, but are not limited to, wearable navigation devices, smartphones, wrist watches, helmet cameras, etc., whether presently existing or developed in the future. The mobile device 100 includes a processor 111 (or processor core), one or more Digital Signal Processors (DSP) 120, and memory unit 160. The mobile device 100 may also include a wireless transceiver 130 configured to send and receive wireless signals 134 via a wireless antenna 132 over a wireless network. The wireless transceiver 130 is connected to a bus 101. Here, the mobile device 100 is illustrated as having a single wireless transceiver 130. However, a mobile device 100 can alternatively have multiple wireless transceivers 130 and wireless antennas 132 to support multiple communication standards such as Wi-Fi, CDMA, Wideband CDMA (WCDMA), Long Term Evolution (LTE), Bluetooth short-range wireless communication technology, etc.

The wireless transceiver 130 may support operation on multiple carriers (waveform signals of different frequencies). Multi-carrier transmitters can transmit modulated signals simultaneously on the multiple carriers. Each modulated signal may be a Code Division Multiple Access (CDMA) signal, a Time Division Multiple Access (TDMA) signal, an Orthogonal Frequency Division Multiple Access (OFDMA) signal, a Single-Carrier Frequency Division Multiple Access (SC-FDMA) signal, etc. Each modulated signal may be sent on a different carrier and may carry pilot, overhead information, data, etc.

The mobile device 100 also includes a Global Navigation Satellite System (GNSS) receiver 170 that receives satellite positioning system (SPS) signals 174 (e.g., from SPS satellites) via an SPS antenna 172. The GNSS receiver 170 can communicate with a single global navigation satellite system (GNSS) or multiple such systems. A GNSS can include, but are not limited to, Global Positioning System (GPS), Galileo, Glonass, Beidou (Compass), etc. SPS satellites are also referred to as satellites, space vehicles (SVs), etc. The GNSS receiver 170 processes, in whole or in part, the SPS signals 174 and uses these SPS signals 174 to determine the location of the mobile device 100. The processor 111, DSP 120, and memory 16, and/or specialized processor(s) (not shown) may also be utilized to process the SPS signals 174, in whole or in part, and/or to calculate the location of the mobile device 100, in conjunction with GNSS receiver 170. Storage of information from the SPS signals 174 or other location signals is performed using a memory unit 160 or registers (not shown). While only one processor 111, DSP 120, and a memory unit 160 are shown in FIG. 1, more than one of any, a pair, or all of these components could be used by the mobile device 100.

The memory unit 160 can include a non-transitory computer-readable storage medium (or media) that stores functions as one or more instructions or code. Media that can make up the memory unit 160 include, but are not limited to, RAM, ROM, FLASH, disc drives, etc. In general, the functions stored by the memory unit 160 are executed by the processor 111, DSP 120, or other specialized processors. Thus, the memory unit 160 is a processor-readable memory and/or a computer-readable memory that stores software (programming code, instructions, etc.) configured to cause the processor 111 to perform the functions described. Alternatively, one or more functions of the mobile device 100 may be performed in whole or in part in hardware.

A mobile device 100 can estimate its current position within an associated system using various techniques, based on other communication entities within view and/or information available to the mobile device 100. For instance, a mobile device 100 can estimate its position using information obtained from access points (APs) associated with one or more wireless local area networks (LANs), personal area networks (PANs) utilizing a short-range wireless communication technology such as Bluetooth or ZigBee®, etc., SPS satellites, and/or map constraint data obtained from a map server or LCI server. Duty-cycle based power savings techniques may be used to determine a position for the mobile device 100. For example, a GNSS Dynamic Power Optimization (DPO) algorithm may turn off GNSS Radio Frequency (RF) parts to reduce current consumption and extend battery life. When a DPO algorithm is active, the GPS receiver 170 is generally not in a continuous mode. The DPO may be configured to wake up at varying intervals, such as every 0.9 to 1.3 seconds. Other wake up periods may also be used.

The mobile device includes one or more accelerometers 140 and other sensors 150 configured to detect the displacement of the mobile device 100. The accelerometers 140 may include a 3-axis accelerometer to drive a pedometer and determine a step count or step rate. Other sensors 150 may include magnetometer, solid state compasses, gyroscopes, and pressure sensors. In an example, the other sensors 150 may be used to detect arm swing motion and an arm swing period.

Figure 2:
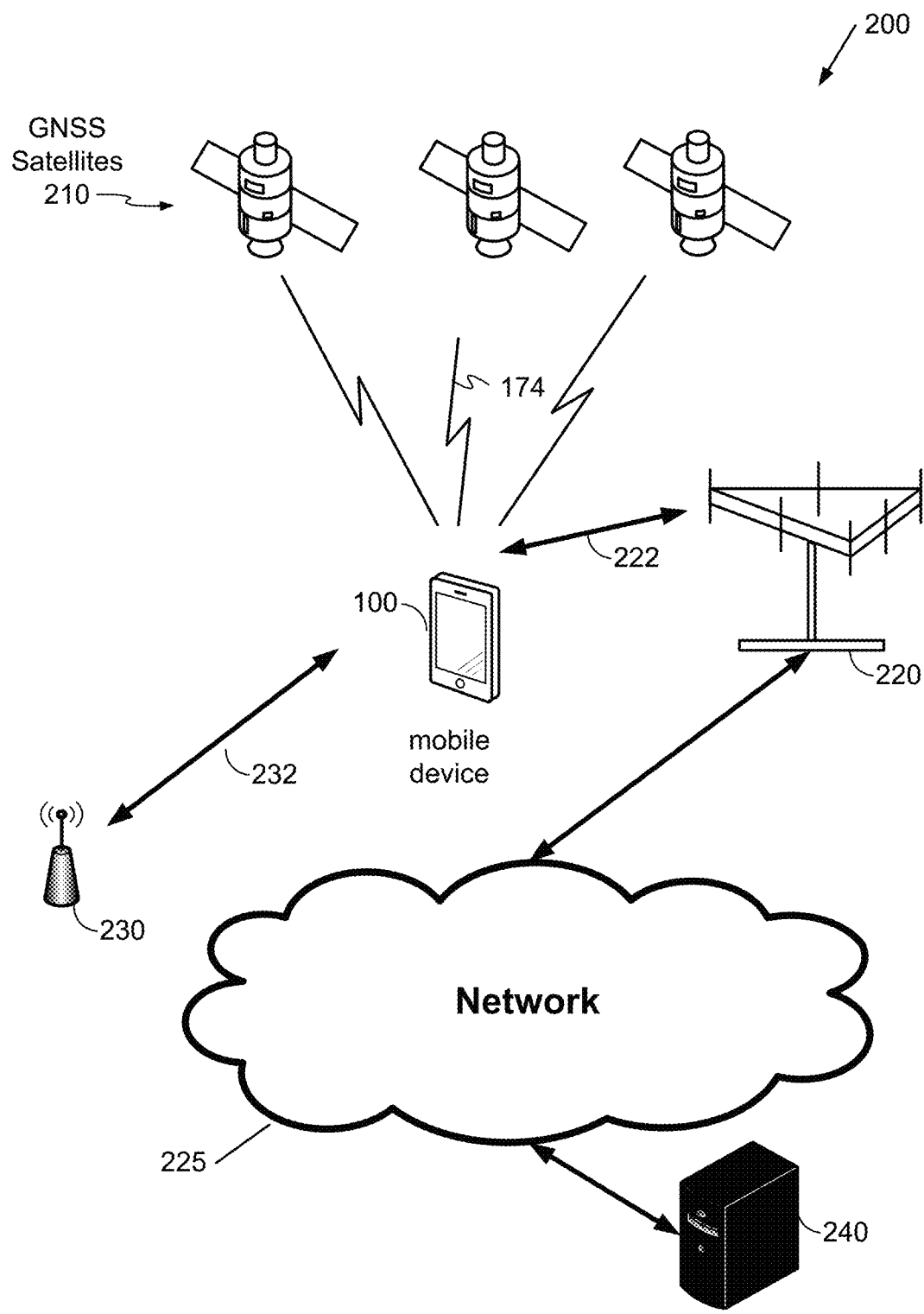
FIG. 2 is a block diagram of an example network architecture configured to communicate with the mobile device of FIG. 1

Referring to FIG. 2, an example network architecture 200 configured to communicate with the mobile device of FIG. 1 is shown. The mobile device 100, which may also be referred to as a UE (or user equipment), may transmit radio signals to, and receive radio signals from, a wireless communication network. In one example, mobile device 100 may communicate with a cellular communication network by transmitting wireless signals to, or receiving wireless signals from a cellular transceiver 220 which may comprise a wireless base transceiver subsystem (BTS), a Node B or an evolved NodeB (eNodeB) over wireless communication link 222. Similarly, mobile device 100 may transmit wireless signals to, or receive wireless signals from local transceiver 230 over wireless communication link 232. A local transceiver 230 may comprise an access point (AP), femtocell, Home Base Station, small cell base station, Home Node B (HNB) or Home eNodeB (HeNB) and may provide access to a wireless local area network (WLAN, e.g., IEEE 802.11 network), a wireless personal area network (WPAN, e.g., Bluetooth® network) or a cellular network (e.g. an LTE network or other wireless wide area network such as those discussed in the next paragraph). Of course it should be understood that these are merely examples of networks that may communicate with a mobile device over a wireless link, and claimed subject matter is not limited in this respect.

Examples of network technologies that may support wireless communication link 222 are Global System for Mobile Communications (GSM), Code Division Multiple Access (CDMA), Wideband CDMA (WCDMA), Long Term Evolution LTE), High Rate Packet Data (HRPD). GSM, WCDMA and LTE are technologies defined by 3GPP. CDMA and HRPD are technologies defined by the 3rd Generation Partnership Project 2 (3GPP2). WCDMA is also part of the Universal Mobile Telecommunications System (UMTS) and may be supported by an HNB. Cellular transceivers 220 may comprise deployments of equipment providing subscriber access to a wireless telecommunication network for a service (e.g., under a service contract). Here, a cellular transceiver 220 may perform functions of a cellular base station in servicing subscriber devices within a cell determined based, at least in part, on a range at which the cellular transceiver 220 is capable of providing access service. Examples of radio technologies that may support wireless communication link 222 are IEEE 802.11, Bluetooth (BT) and LTE.

In a particular implementation, cellular transceiver 220 and local transceiver 230 may communicate with one or more servers 240 over a network 225. Here, the network 225 may comprise any combination of wired or wireless links and may include cellular transceiver 220 and/or local transceiver 230 and/or servers 240. In a particular implementation, network 225 may comprise Internet Protocol (IP) or other infrastructure capable of facilitating communication between mobile device 100 and servers 240 through local transceiver 230 or cellular transceiver 220. In an implementation, network 225 may comprise cellular communication network infrastructure such as, for example, a base station controller or packet based or circuit based switching center (not shown) to facilitate mobile cellular communication with mobile device 100. In a particular implementation, network 225 may comprise local area network (LAN) elements such as WiFi APs, routers and bridges and may in that case include or have links to gateway elements that provide access to wide area networks such as the Internet. In other implementations, network 225 may comprise a LAN and may or may not have access to a wide area network but may not provide any such access (if supported) to mobile device 100. In some implementations the network 225 may comprise multiple networks (e.g., one or more wireless networks and/or the Internet). In one implementation, network 225 may include one or more serving gateways or Packet Data Network gateways. In addition, one or more of servers 240 may be an E-SMLC, a Secure User Plane Location (SUPL) Location Platform (SLP), a SUPL Location Center (SLC), a SUPL Positioning Center (SPC), a Position Determining Entity (PDE) and/or a gateway mobile location center (GMLC), each of which may connect to one or more location retrieval functions (LRFs) and/or mobility management entities (MMEs) in network 225.

In particular implementations, and as discussed below, mobile device 100 may have circuitry and processing resources capable of obtaining location related measurements (e.g. for signals received from GPS or other Satellite Positioning System (SPS) satellites 210, cellular transceiver 220 or local transceiver 230) and possibly computing a position fix or estimated location of mobile device 100 based on these location related measurements. In some implementations, location related measurements obtained by mobile device 100 may be transferred to a location server such as an enhanced serving mobile location center (E-SMLC) or SUPL location platform (SLP) (e.g. which may be one of the one or more servers 240) after which the location server may estimate or determine a location for mobile device 100 based on the measurements. In the presently illustrated example, location related measurements obtained by mobile device 100 may include measurements of SPS signals 174 received from satellites belonging to an SPS or Global Navigation Satellite System (GNSS) such as GPS, GLONASS, Galileo or Beidou and/or may include measurements of signals (such as 222 and/or 232) received from terrestrial transmitters fixed at known locations (e.g., such as cellular transceiver 220). Mobile device 100 or a separate location server may then obtain a location estimate for mobile device 100 based on these location related measurements using any one of several position methods such as, for example, GNSS, Assisted GNSS (A-GNSS), Advanced Forward Link Trilateration (AFLT), Observed Time Difference Of Arrival (OT-DOA) or Enhanced Cell ID (E-CID) or combinations thereof. In some of these techniques (e.g. A-GNSS, AFLT and OTDOA), pseudoranges or timing differences may be measured at mobile device 100 relative to three or more terrestrial transmitters fixed at known locations or relative to four or more satellites with accurately known orbital data, or combinations thereof, based at least in part, on pilots, positioning reference signals (PRS) or other positioning related signals transmitted by the transmitters or satellites and received at mobile device 100. Doppler measurements may be made to various signal sources such as the cellular transceiver 220, the local transceiver 230, and GNSS satellites 210, and various combination therein. The one or more servers 240 may be capable of providing positioning assistance data to mobile device 100 including, for example, information regarding signals to be measured (e.g., signal timing), locations and identities of terrestrial transmitters and/or signal, timing and orbital information for GNSS satellites to facilitate positioning techniques such as A-GNSS, AFLT, OTDOA and E-CID. For example, the one or more servers 240 may comprise an almanac which indicates locations and identities of cellular transceivers and/or local transceivers in a particular region or regions such as a particular venue, and may provide information descriptive of signals transmitted by a cellular base station or AP such as transmission power and signal timing. In the case of E-CID, a mobile device 100 may obtain measurements of signal strengths for signals received from cellular transceiver 220 and/or local transceiver 230 and/or may obtain a round trip signal propagation time (RTT) between mobile device 100 and a cellular transceiver 220 or local transceiver 230. A mobile device 100 may use these measurements together with assistance data (e.g. terrestrial almanac data or GNSS satellite data such as GNSS Almanac and/or GNSS Ephemeris information) received from the one or more servers 240 to determine a location for mobile device 100 or may transfer the measurements to the one or more servers 240 to perform the same determination.

A mobile device (e.g. mobile device 100 in FIG. 1) may be referred to as a device, a wireless device, a mobile terminal, a terminal, a mobile station (MS), a user equipment (UE), a SUPL Enabled Terminal (SET) or by some other name and may correspond to a cellphone, smartphone, wrist watch, tablet, PDA, tracking device or some other portable or moveable device. Typically, though not necessarily, a mobile device may support wireless communication such as using GSM, WCDMA, LTE, CDMA, HRPD, WiFi, BT, WiMax, etc. A mobile device may also support wireless communication using a wireless LAN (WLAN), DSL or packet cable for example. A mobile device may comprise a single entity or may comprise multiple entities such as in a personal area network where a user may employ audio, video and/or data I/O devices and/or body sensors and a separate wireline or wireless modem. An estimate of a location of a mobile device (e.g., mobile device 100) may be referred to as a location, location estimate, location fix, fix, position, position estimate or position fix, and may be geographic, thus providing location coordinates for the mobile device (e.g., latitude and longitude) which may or may not include an altitude component (e.g., height above sea level, height above or depth below ground level, floor level or basement level). Alternatively, a location of a mobile device may be expressed as a civic location (e.g., as a postal address or the designation of some point or small area in a building such as a particular room or floor). A location of a mobile device may also be expressed as an area or volume (defined either geographically or in civic form) within which the mobile device is expected to be located with some probability or confidence level (e.g., 67% or 95%). A location of a mobile device may further be a relative location comprising, for example, a distance and direction or relative X, Y (and Z) coordinates defined relative to some origin at a known location which may be defined geographically or in civic terms or by reference to a point, area or volume indicated on a map, floor plan or building plan. In the description contained herein, the use of the term location may comprise any of these variants unless indicated otherwise.

Figure 3A:
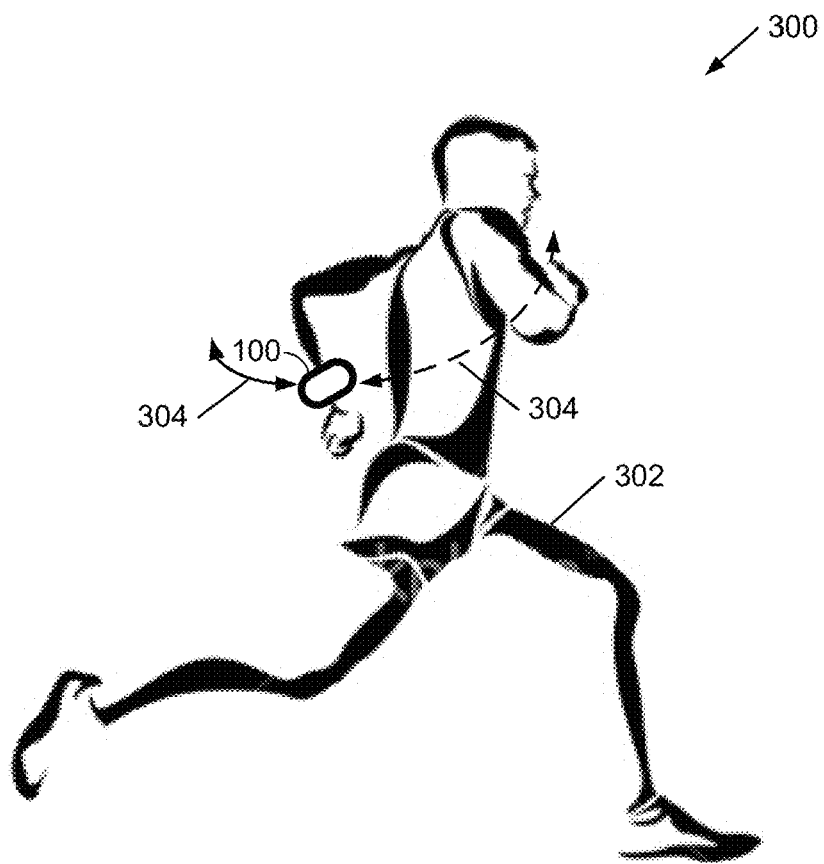
FIGS. 3A and 3B are illustrations of the velocity impact of swinging mobile device.
Figure 3B:
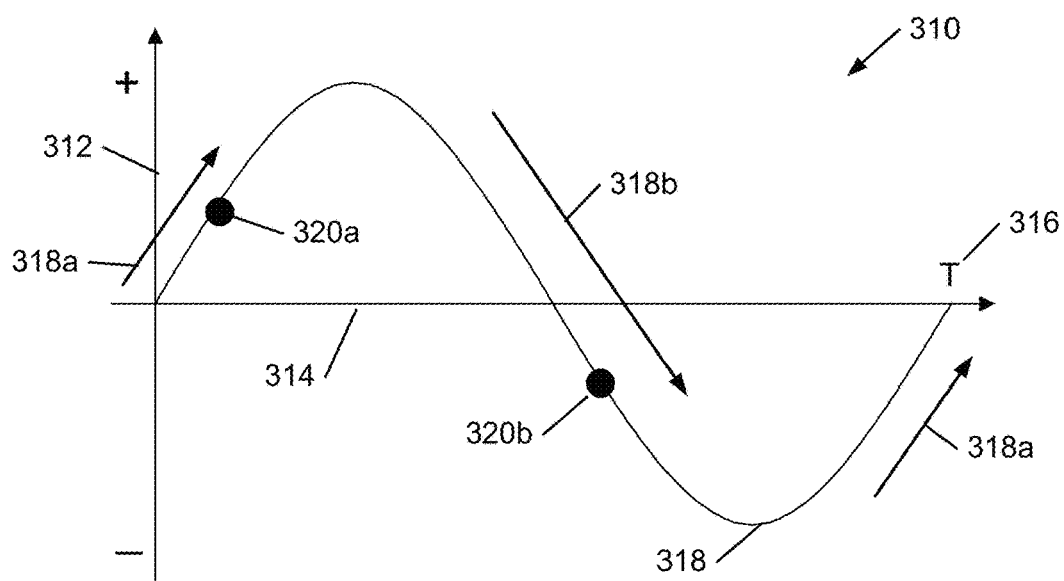

Referring to FIGS. 3A and 3B, with further reference to FIG. 1, an illustration 300 of the velocity impact of a swing on the mobile device 100 and an illustration of an approximate sinusoidal curve diagram 310 are shown. The illustration 300 includes a user 302 wearing a mobile device 100 on their wrist. The location of the mobile device is exemplary only, and not a limitation, as the arm swing compensation techniques described herein may be applied to any relative and periodic movement between the mobile device 100 and the user 302. For example, a mobile device 100 may be worn on the user's ankle, thigh, forearm, or bicep. As the user 302 ambulates (e.g., walking, jogging, running) the mobile device 100 traverses through an arm swing arc 304 at an approximately regular interval, such as with an oscillating pendulum. The resulting oscillation may be modeled as approximately sinusoidal such that there are regular maximum and regular minimum values. The relative motion of the mobile device 100 as it traverses the arm swing arc results in a relative change in the measured velocity of the user. That is, as the arm swings forward and backward, the relative velocity of the user is increased and decreased respectively. The illustration of an approximate sinusoidal curve diagram 310 includes a magnitude axis 312, a time axis 314, a value T 316 indicates the duration of one cycle (e.g., the arm swing period), and an approximately sinusoidal curve 318. The curve 318 represents the relative movement of the mobile device 100 as it traverses the arm swing arc 304. For purposes of explanation, the curve 318 is labeled with a first section 318a and a second section 318b. The first section 318a indicates the mobile device 100 is swinging from back to front, and the second section 318b indicates the mobile device is swinging from front to back. The oscillations in the relative motion of the mobile device 100 can create a bias in the velocity as measured by the GNSS receiver 170.

Figure 4A:
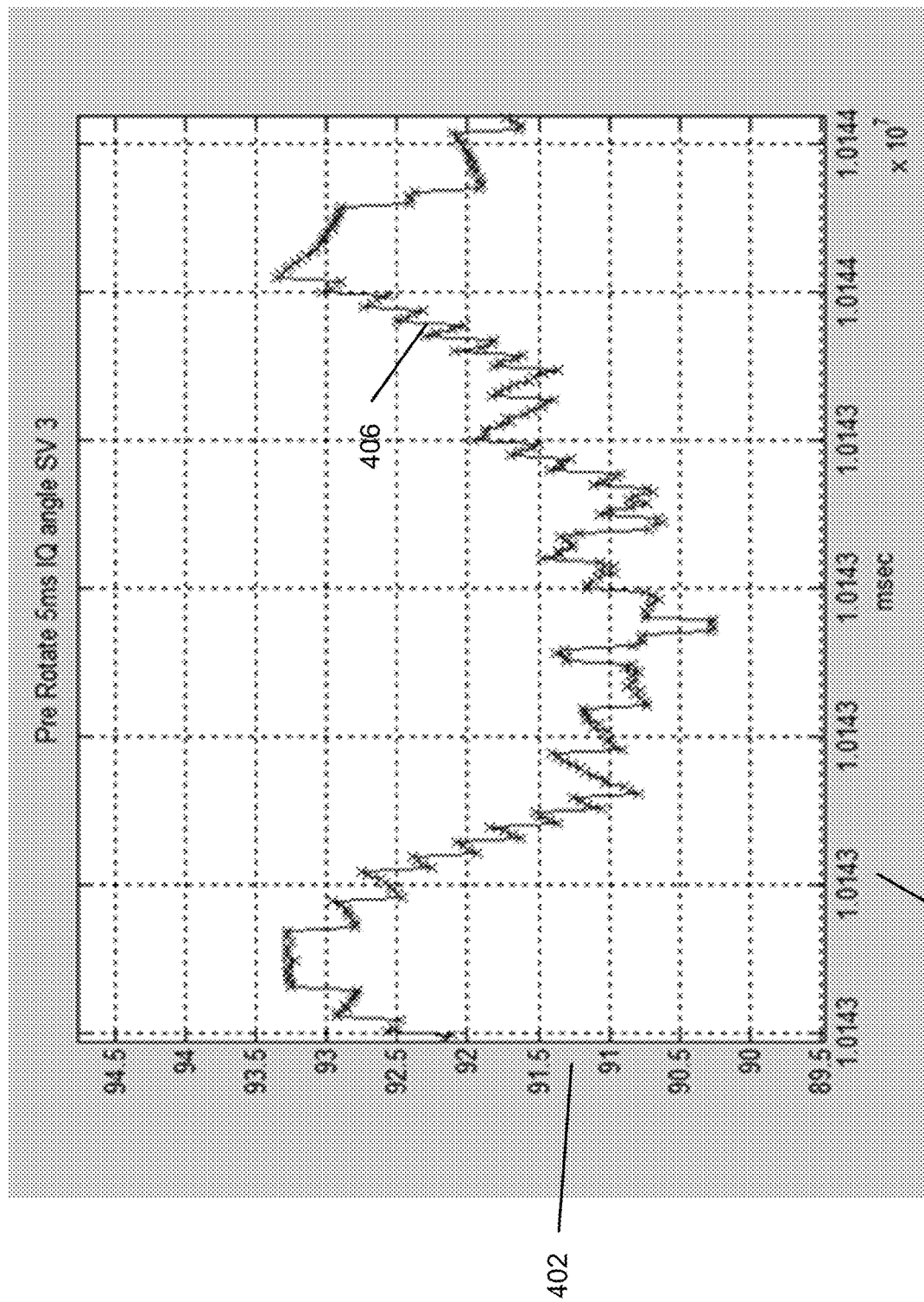
FIGS. 4A and 4B are graphical representations of the velocity impact caused by an arm swing.
Figure 4B:
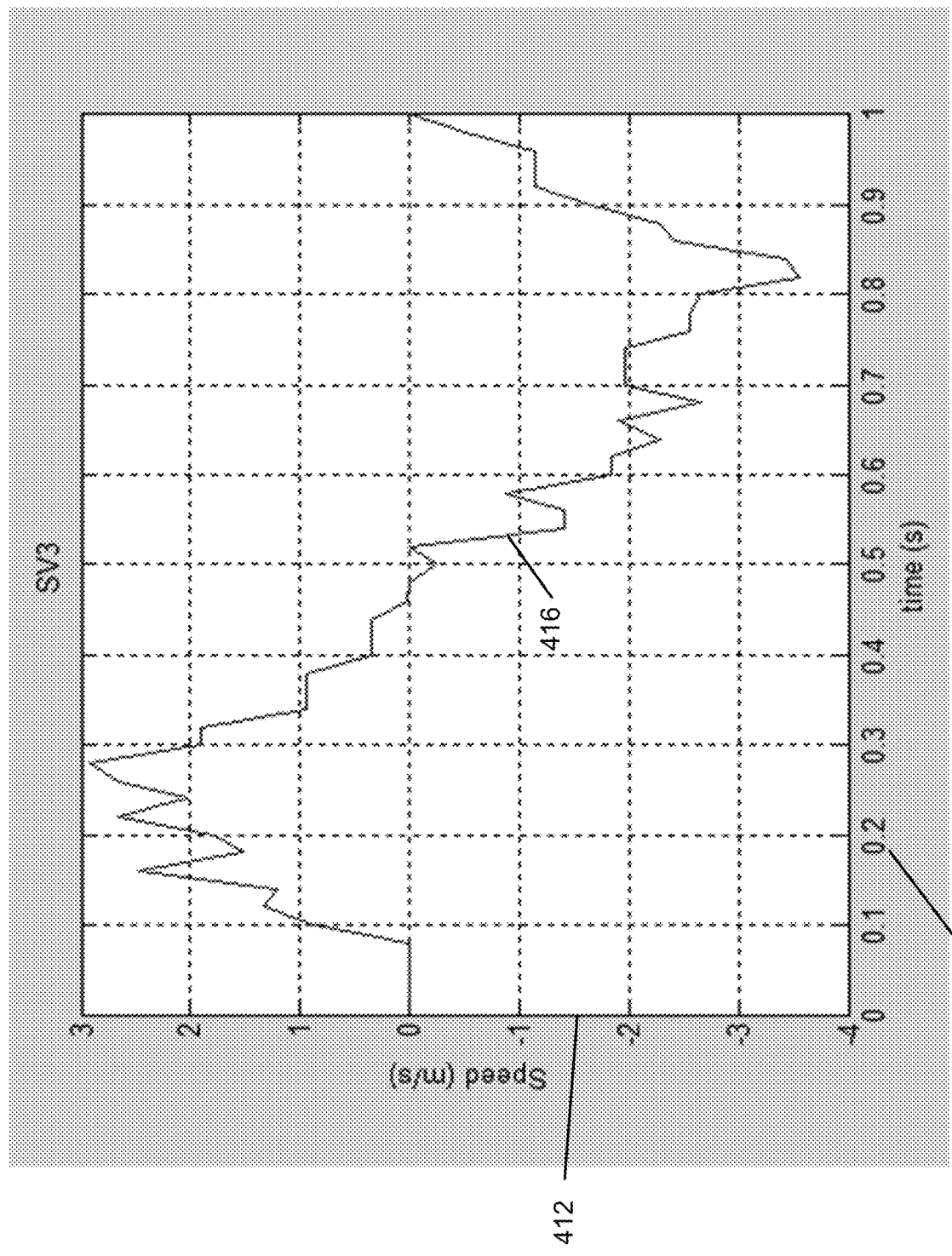

Referring to FIGS. 4A and 4B, with further reference to FIGS. 3A and 3B, graphical representations of the velocity impact caused by arm swing motion are shown. FIG. 4A includes an I/Q phase axis 402, a msec time axis 404, and an I/Q phase results 406 for a mobile device 100 that is moving. The results 406 illustrate a saw tooth pattern as the mobile device 100 traverses along a portion of an example arm swing arc 304. FIG. 4B includes a velocity axis 412, a seconds time axis 414, and a velocity result 416 for an arm swing period T of one second. In this example, the velocity results 416 indicate the velocity bias caused by the arm swing motion may be up to +/−3 m/s.

In an effort to conserver power, the GNSS receiver 170 may utilize DPO features to acquire satellite signals (e.g., positioning signals) and compute a current velocity on a periodic basis (e.g., every 0.5, 1.0, 1.5 seconds). Referring back to FIGS. 3A and 3B, if the interval of acquiring the positioning signals is the same as the arm swing period T 316, then a velocity bias will impact the velocity calculations. For example, if the position signals are received at a forward bias point 320a on consecutive cycles, the resulting velocity calculated by the mobile device 100 will be higher (i.e., faster) than the actual velocity of the user. Conversely, if the position signals are received at a reverse bias point 320b on consecutive cycles, the resulting velocity calculated by the mobile device 100 will be lower (i.e., slower) than the actual velocity of the user. In this example the forward bias point 320a and the reverse bias point 320b are complementary because they have approximately the same magnitudes in opposite directions (e.g., they offset one another). Pairs of bias points in 180 degree phases are also complementary. If the positioning signals are received at the forward bias point 320a on one cycle, and at the reverse bias point 320b on another cycle, then the net bias is canceled (e.g., 180 degree phase pairs such that the positive and negative components are equal). In operation on a mobile device 100, the GNSS receiver 170 is unlikely to operate continuously and thus the curve 318, and the corresponding forward and reverse bias points, may not be known. The arm swing period T 316, however, may be determined by the mobile device 100 and thus the position signal measurement period may be set to a value that is not equal to T.

The arm swing period T 316 may be determined by the mobile device based on input from the accelerometer(s) 140 and/or the other sensors 150. For example, the accelerometer(s) 140 may detect the arm swing via the change in direction at the opposing ends of the swing. The accelerometer may be a means for detecting a foot fall rate. The foot fall rate is twice the arm swing rate (i.e., two steps per arm swing period T). A pedometer or other motion sensor may be used to detect foot falls. A gyroscope in the mobile device 100 may be configured to detect changes in direction at the opposing ends of the arm swing arc 304. In an embodiment, the GNSS receiver 170 may be configured to oversample the Doppler in the SPS signal for a short period of time, and use the average Doppler as the velocity and the peaks in oscillation around the average to detect the periodicity of the arm swing. The intersection of the detected oscillating waveform with the average to detect the periodicity of the arm swing. In addition to using GNSS signals for detecting Doppler, WAN signals may be used if GNSS have not yet been acquired or power resources are limited. In an example, the mobile device 100 is configured to detect approximately where it is located on a user (i.e., worn on the wrist or in the hand versus in the pocket) before attempting to determine an arm swing arc. In some cases, such as when the mobile device is stationary relative to the user (e.g. shirt pocket, hat, pant pocket) an arm swing arc calculation is not required. Where the mobile device is worn may be detected via the accelerometer(s) 140, such as by detecting whether there was horizontal oscillation in velocity/acceleration or whether it was steady state or similarly through Doppler oversampling as described above (i.e., whether velocity is constant or oscillating as expected in an arm swing arc). A light sensor may be utilized to detect if the mobile device 100 is in a pocket, bag, etc.

Figures 5A, 5B:
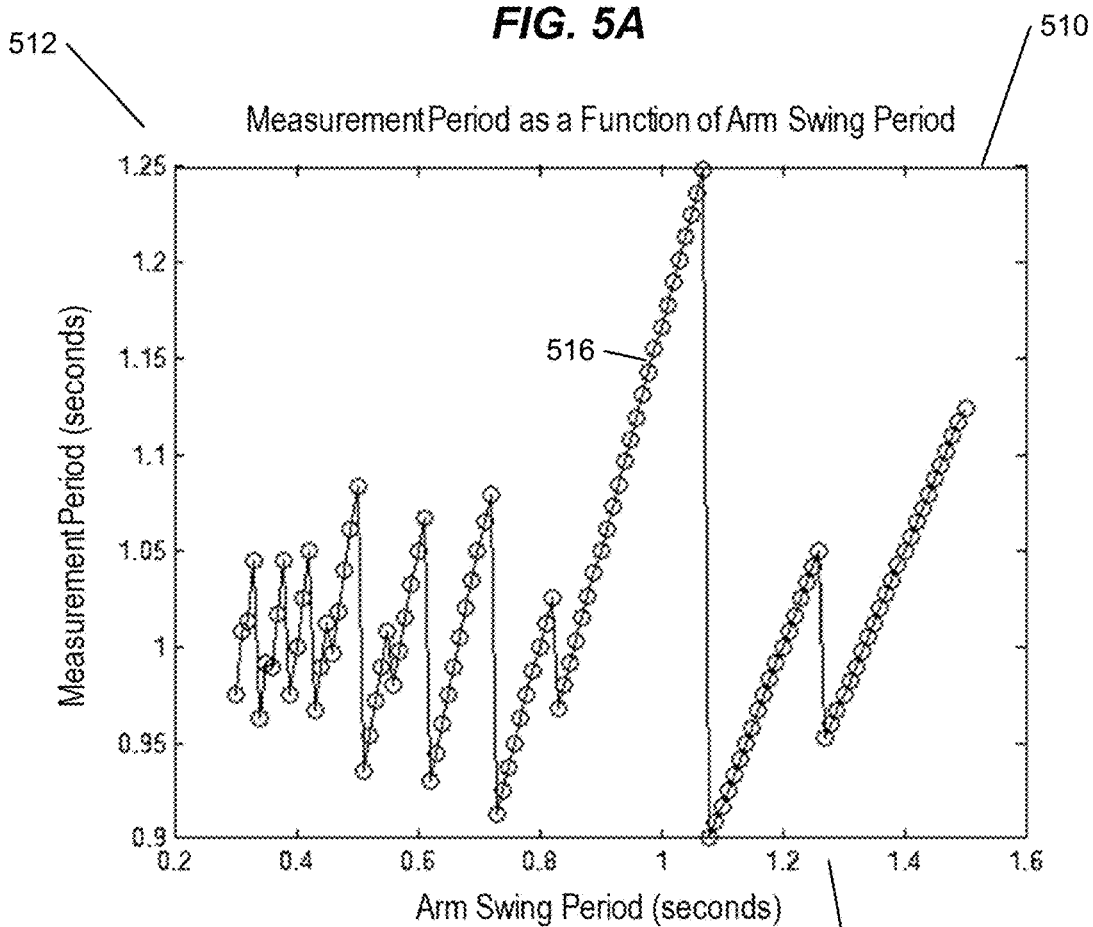
FIGS. 5A and 5B include examples of position signal measurement periods.

Referring to FIGS. 5A and 5B, examples of position signal measurement periods are shown. An example of a position signal measurement period table 500 includes an arm swing period T value column 502, an N value column 504, a K value column 506, and a position measurement period column 508. The T values in the T value column 502 are based on the measurement techniques previously described. For example, one or more accelerometers 140 or other sensors 150 in the mobile device may determine a foot fall rate for the user 302, and the arm swing period T is calculated based on the foot fall intervals. There are generally two foot falls for each arm swing arc 304. The values in the position measurement period column 508 are determined such that:

Position Measurement Period (MP)=(N*T)+(T/K)

The values of N and K, as indicted in the N value column 504 and the K value column 506 respectively, are selected to satisfy mobile device performance criteria. The value for K is limited to positive and negative even integers (e.g., +/−2, +/−4, +/−6, +/−8, etc. . . . ). In general, the larger the value of K, the longer the time required to complete all of the 180 degree pairs (e.g., if K=6, 6 position measurement periods will be required to complete all of the 180 pairs). The value for N is a non-negative integer, typically 0, 1 or 2. The mobile device performance criteria may be to ensure the value for the position measurement period (MP) conforms to hardware and/or software requires. For example, it may be desirable to maintain an MP of 1 second based on the regular operation of the GNSS receiver 170. Thus, given an arm swing period value T, the values for N and K may be selected to keep the MP value close to 1 sec as practical, and within the 0.9 secs and 1.3 secs. Other constraints may be used based hardware performance and other operational requirements. A collection of possible MP values are provided in FIG. 5B. An MP value chart 510 includes an arm swing period axis 514 (e.g., T values), and MP value axis 512, and a collection of MP values 516 across a range of T values. The collection of MP values 516 are based on an arm swing period T resolution of 0.01 seconds, within an arm swing period T range from 0.3 s to 1.5 s.

Figure 6A:
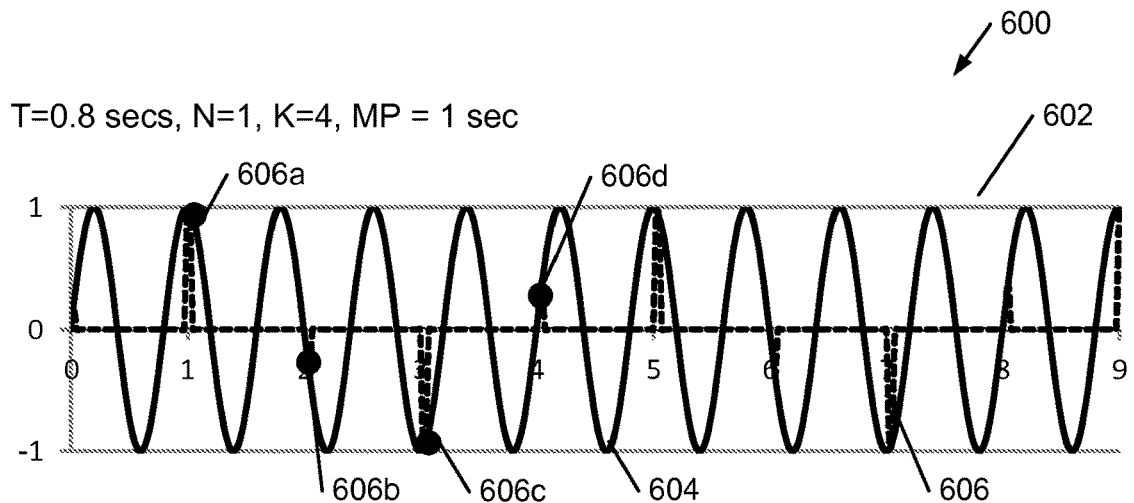
FIGS. 6A, 6B and 6C include graphical representations of arm swing periods and position signal measurement periods.
Figure 6B:
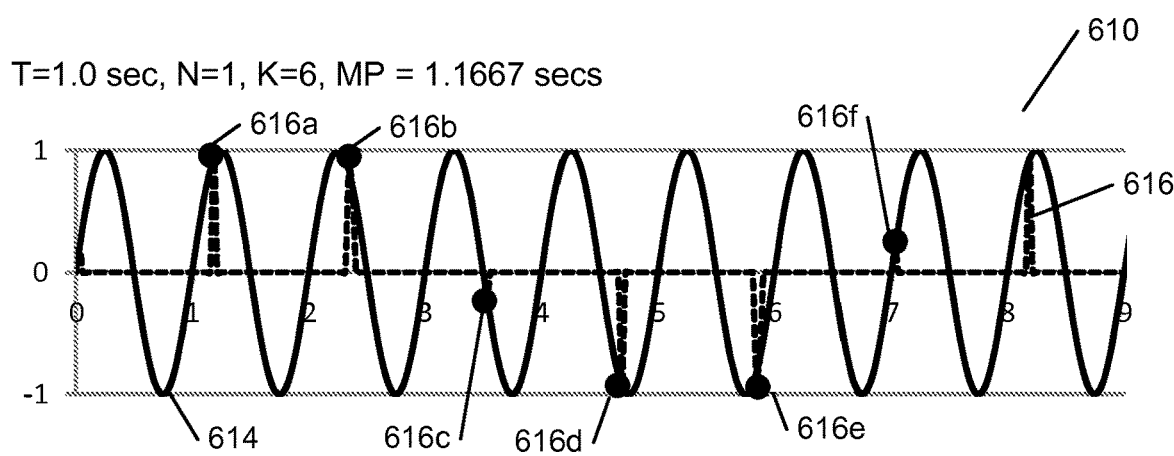
Figure 6C:
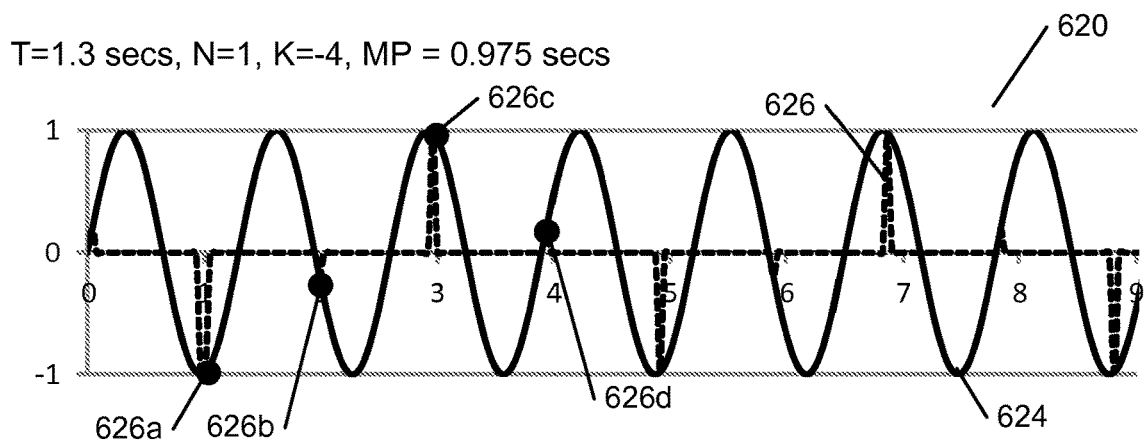

Referring to FIGS. 6A, 6B and 6C, with further reference to FIGS. 3A, 3B and 5, graphical representations of arm swing periods and position signal measurement periods 600 are shown. Each representation includes a time scale from t=0 to t=9 and a relative value between +1 (e.g., max) and −1 (e.g., min) on the y-axis. One or more position signal measurement time pairs in 180 degree phases (i.e., complementary pairs) are also highlighted for illustrative purposes. The duration in which a position signal is received may vary (i.e., based on processor, processor status, and other hardware and/or software requirements). The position signal measurement period may be determined from any consistent point in a position process, such as at the start of the execution of each position signal measurement.

A first graph 602 is based on a T value equal to 0.8 seconds, an N value equal to 1, a K value equal to 4, and the resulting measurement period (MP) of 1 second. The first graph 602 includes an oscillating arm swing indicator 604 with a period of 0.8 seconds, and a repeating position signal measurement indicator 606. Examples of intersections between the arm swing oscillations and the position signal measurement times are highlighted with dotted lines and dark circles. For example, a t=1 sec. position signal measurement 606a is phased 180 degrees from (e.g., complementary to) a t=3 sec. position signal measurement 606c. A t=2 sec. position signal measurement 606b is phased 180 degrees from (e.g., complementary to) a t=4 sec. position signal measurement 606d.

A second graph 610 in FIG. 6B is based on a T value equal to 1.0 seconds, an N value equal to 1, a K value equal to 6, and the resulting measurement period (MP) of 1.1667 second. The second graph 610 includes an oscillating arm swing indicator 614 with a period of 1.0 second, and a repeating position signal measurement indicator 616. Examples of intersections between the arm swing oscillations and the position signal measurement times are highlighted with dotted lines and dark circles. For example, a t=1.1667 sec. position signal measurement 616a is phased 180 degrees from (e.g., complementary to) a t=4.667 sec. position signal measurement 616d. A t=2.334 sec. position signal measurement 616b is phased 180 degrees from (e.g., complementary to) a t=5.8335 sec. position signal measurement 616e. A t=3.5 sec. position signal measurement 616c is phased 180 degrees from (e.g., complementary to) a t=7.0 sec. position signal measurement 616f.

A third graph 620 in FIG. 6C is based on a T value equal to 1.3 seconds, an N value equal to 1, a K value equal to minus 4, and the resulting measurement period (MP) of 0.975 second. The third graph 620 includes an oscillating arm swing indicator 624 with a period of 1.3 seconds, and a repeating position signal measurement indicator 626. Examples of intersections between the arm swing oscillations and the position signal measurement times are highlighted with dotted lines and dark circles. For example, a t=0.975 sec. position signal measurement 626a is phased 180 degrees from (e.g., complementary to) a t=2.925 sec. position signal measurement 626c. A t=1.95 sec. position signal measurement 626b is phased 180 degrees from (e.g., complementary to) a t=3.9 sec. position signal measurement 626d.

Figure 7:
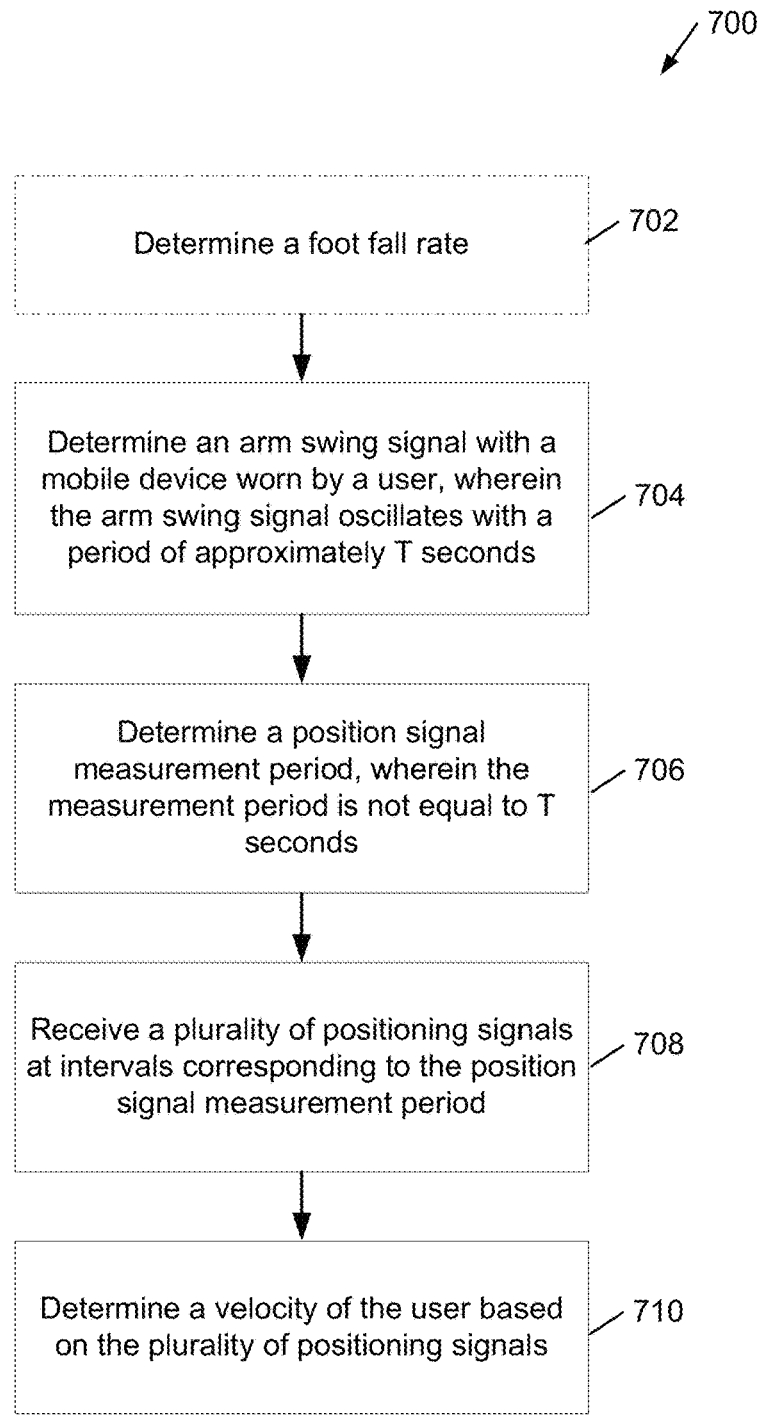
FIG. 7 is a flow diagram of a process for determining a position signal measurement period.

Referring to FIG. 7, with further reference to FIGS. 1-6, a process 700 for determining a position signal measurement includes the stages shown. The process 700 is, however, an example only and not limiting. The process 700 can be altered, e.g., by having stages added, removed, rearranged, combined, performed concurrently, and/or having single stages split into multiple stages. For example, a mobile device 100 may determine an arm swing signal based on a foot fall rate, or through the use of accelerometers 140 or other sensors 150. The example discussed here is an example only, and not limiting of the mobile device 100.

At stage 702, the mobile device 100 is optionally configured to determine a foot fall rate. The accelerometers 140 and the processor 111 are a means to determine a foot fall rate. The mobile device may include a pedometer, or other sensors to detect a user's steps. The step detection may be performed as described in U.S. Patent Pub. No. 2014/0257766, filed Mar. 6, 2013, titled "Adaptive Probabilistic Step Detection for Pedestrian Positioning," and U.S. Patent Pub. No. 2014/0180621, filed Oct. 2, 2013, titled "Swing Compensation in Step Detection," the contents of which are incorporated by reference in their entirety.

At stage 704, the mobile device 100 is configured to determine an arm swing signal while being worn by a user, wherein the arm swing signal oscillates with a period of approximately T seconds. The accelerometers 140, or other sensors 150 such as magnetometer, solid state compasses, pedometers, gyroscopes, and pressure sensors are a means for determining an arm swing signal. The arm swing signal may oscillate at a regular interval, such as the oscillating arm swing indicator 604. The foot fall rate determined at stage 702 may be used to determine the period of an arm swing (T). For example, the foot fall rate divided by 2 may be used as the value of T (i.e., there are two steps for an arm swing). The period T is typically between 0.5-2.0 seconds. The mobile device may periodically determine the period of the arm swing (T), thus the value of T, and the corresponding signal measurement period, may change over time with changes in the user's velocity and arm swing period (e.g., during different periods of walking, jogging, running).

At stage 706, the mobile device 100 is configured to determine a position signal measurement period, wherein the measurement period is not equal to T seconds, as determined at stage 704. The mobile device may include one or more power optimization algorithms (e.g., DPO features) configured to reduce the amount of power consumed by the GNSS receiver 170. As a result, the GNSS receiver 170 may be configured to wake up and receive position signals (e.g., SPS signals 174) on a periodic basis. The interval is typically dependent on performance, hardware and other design considerations but it may be in the range from 0.5 to 30 seconds. An initial position signal measurement period may be 1 second, and then modified if the value of T is also 1 second. The position signal measurement period may be reduced to increase accuracy (and increase power consumption), or the position signal measurement period may be increased at the cost of accuracy but decreasing power consumption. The increase in the position measurement signal should not be a harmonic of the arm swing period T (e.g. if T=1.2 seconds, the measurement period should not be 1.2 s, 2.4 s, 3.6 s, 4.8 s, etc. . . . ). The measurement period may vary and does not need to be constant from cycle to cycle. (e.g., if T=1 second, measurements may be taken at 0.8 s, 2.5 s, 3.3 s, 5 s, etc. . . . ). The position signal measure period may also be determined periodically, such as when the value of the arm swing period (T) changes.

At stage 708, the mobile device is configured to receive a plurality of positioning signals at intervals corresponding to the position signal measurement period. The GNSS receiver 170 and wireless transceivers 130 are examples of means for receiving a plurality of positioning signals 174. The mobile device 100 can also estimate its position using positioning signals obtained from local transceivers 23 and cellular transceivers 220 associated with one or more wireless local area networks (LANs), personal area networks (PANs) utilizing a short-range wireless communication technology such as Bluetooth or ZigBee®, Visible Light Communication (VLC) signals, and/or map constraint data obtained from a map server or LCI server. At stage 710, the mobile device 100 is configured to determine a velocity of the user based on the plurality of positioning signals. The GNSS receiver 170 and the processor 111 are means for determining the velocity of the user. The velocity components of complementary pairs of position signal measurements may be used to filter out the velocity bias caused by the arm swing, and the remaining velocity vector may be used to determine the velocity of the user. The velocity information, as well as input from the accelerometers 140 and other sensors 150 (e.g., gyroscopes, pressure sensors) may be used in determining current position information for the user. The position information may include geographic coordinates (e.g., lat/long/alt), was well as derivative information such as elevation change rate, and acceleration. The position information may be stored in memory unit 160 and output for use in applications running with the mobile device 100.

Figure 8:
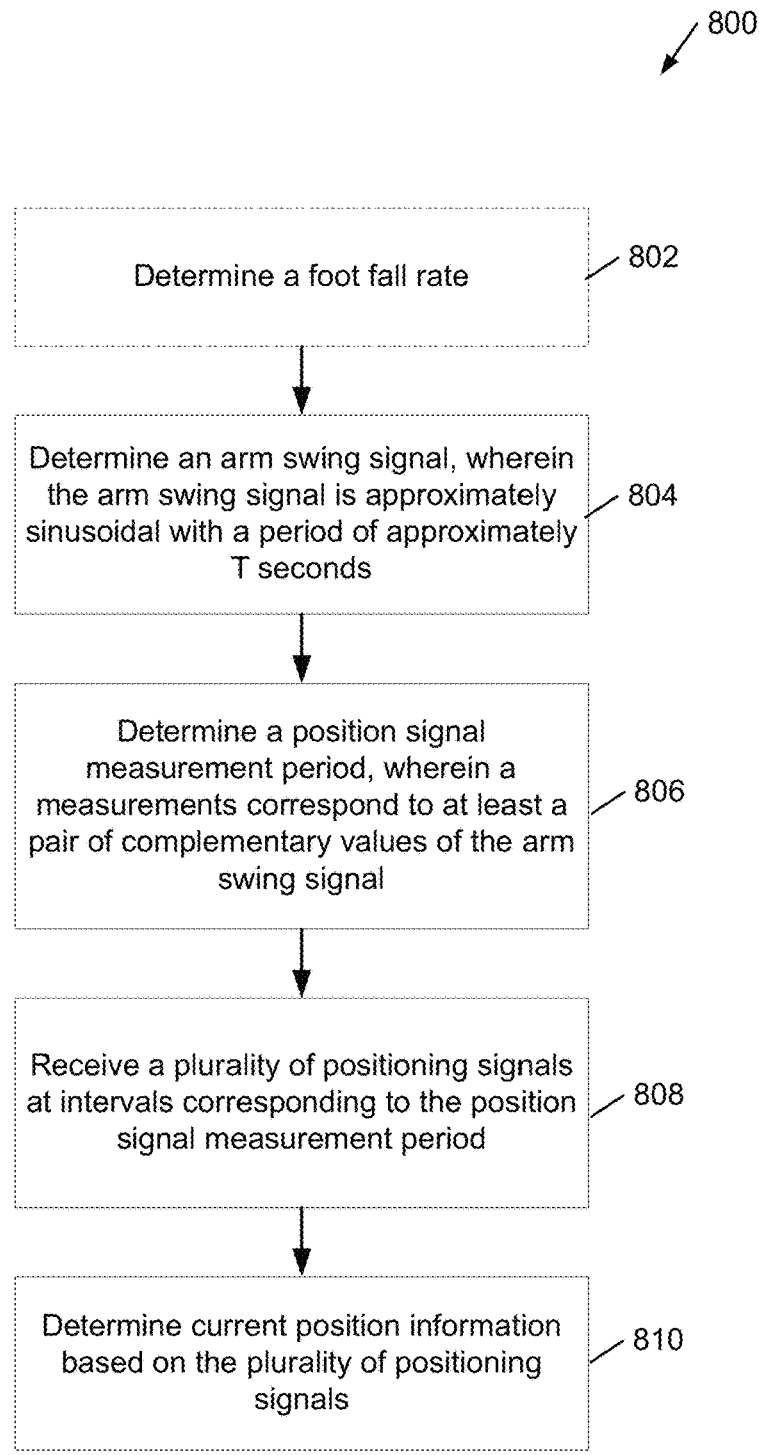
FIG. 8 is a flow diagram of another process for determining a position signal measurement period.

Referring to FIG. 8, with further reference to FIGS. 1-6, another process 800 for determining a position signal measurement includes the stages shown. The process 800 is, however, an example only and not limiting. The process 800 can be altered, e.g., by having stages added, removed, rearranged, combined, performed concurrently, and/or having single stages split into multiple stages. For example, a mobile device 100 may determine an arm swing signal based on a foot fall rate, or through the use of accelerometers 10 or other sensors 150. The example discussed here is an example only, and not limiting of the mobile device 100.

At stage 802, the mobile device 100 is optionally configured to determine a foot fall rate. The accelerometers 140 and the processor 111 are a means to determine a foot fall rate. The mobile device may include a pedometer, or other sensors to detect a user's steps.

At stage 804, the mobile device 100 is configured to determine an arm swing signal, wherein the arm swing signal is approximately sinusoidal with a period of approximately T seconds. The accelerometers 140, or other sensors 150 such as magnetometer, solid state compasses, pedometers, gyroscopes, and pressure sensors may be means for determining an arm swing signal. The arm swing signal may oscillate at a regular interval that is approximately sinusoidal, such as the oscillating arm swing indicator 604. An approximately sinusoidal signal varies from a true sinusoid in that the peak-to-peak values, wavelength and period may vary (e.g., 5%, 10%, 25%) from cycle to cycle such that the actual signal approximates the appearance of a sinusoid. The foot fall rate determined at stage 802 may be used to determine the period T of the approximately sinusoidal signal (e.g., (foot fall rate)/2). As indicated in FIG. 5A, the period T is typically between 0.5-2.0 seconds. The values for every point along the approximately sinusoidal signal need not be determined as a mathematical sinusoid based on the foot fall rate (e.g., T=foot fall rate/2) is sufficient to determine the arm swing signal.

At stage 806, the mobile device 100 is configured to determine a position signal measurement period, wherein the measurement period corresponds to at least a pair of complementary values of the arm swing signal. Complementary values may be pairs of 180 degree phases within a few arm swing cycles. The processor 111 is a means for determining a position signal measurement period. In an example, the processor 111 is configured to determine a solution to the equation:

Position signal measurement period=$(N*T)+(T/K)$;

where:
T is the period determined at stage 804;
N is a non-negative integer; and
K is a positive or negative even integer (e.g., +/−2, +/−4, +/−6, etc. . . . ).

The resulting complementary values correspond to pairs of results such as illustrated in the first graph 602 in FIG. 6A. That is, the t=1 sec. position signal measurement 606a is complementary to the t=3 sec. position signal measurement 606c, and the t=2 sec. position signal measurement 606b is complementary to the t=4 sec. position signal measurement 606d. Other techniques to determine complementary pairs may also be used. For example, the accelerometers and gyroscopes may be used to detect instances of complementary motion (e.g., in opposite directions but with approximately equal magnitudes). Instances which are separated by an interval equal to the value of T/2 may be considered as complementary pairs. For example, if an arm swing period T=1.2 seconds, then T/2=0.6 seconds and measurements taken at $t_1$=0.2 seconds and $t_2$=0.8 are complementary values (i.e., measurements taken at 0.6 second intervals are 180 degrees apart). Complementary values may include values that are taken at two points on the arm swing signal that are spaced by odd number multiple of 180 degrees (e.g., 180 degrees, 540 degrees, 900 degrees).

At stage 808, the mobile device 100 is configured to receive a plurality of positioning signals at intervals corresponding to the position signal measurement period. The GNSS receiver 170 and wireless transceivers 130 are example of means receiving a plurality of positioning signals 174. The mobile device 100 can also estimate its position using positioning signals obtained from local transceivers 23 and cellular transceivers 220 associated with one or more wireless local area networks (LANs), personal area networks (PANs) utilizing a short-range wireless communication technology such as Bluetooth or ZigBee®, Visible Light Communication (VLC) signals, and/or map constraint data obtained from a map server or LCI server. At stage 810, the mobile device 100 is configured to determine current position information based on the plurality of positioning signals. The GNSS receiver 170 and the processor 111 are means for determining current position information. Accelerometers 140 and other sensors 150 (e.g., gyroscopes, pressure sensors) may be used in determining current position information. The position information may include geographic coordinates (e.g., lat/long/alt), as well as derivative information such as velocity and acceleration. The position information may be stored in memory unit 160 and output for use in applications running with the mobile device 100.

Figure 9:
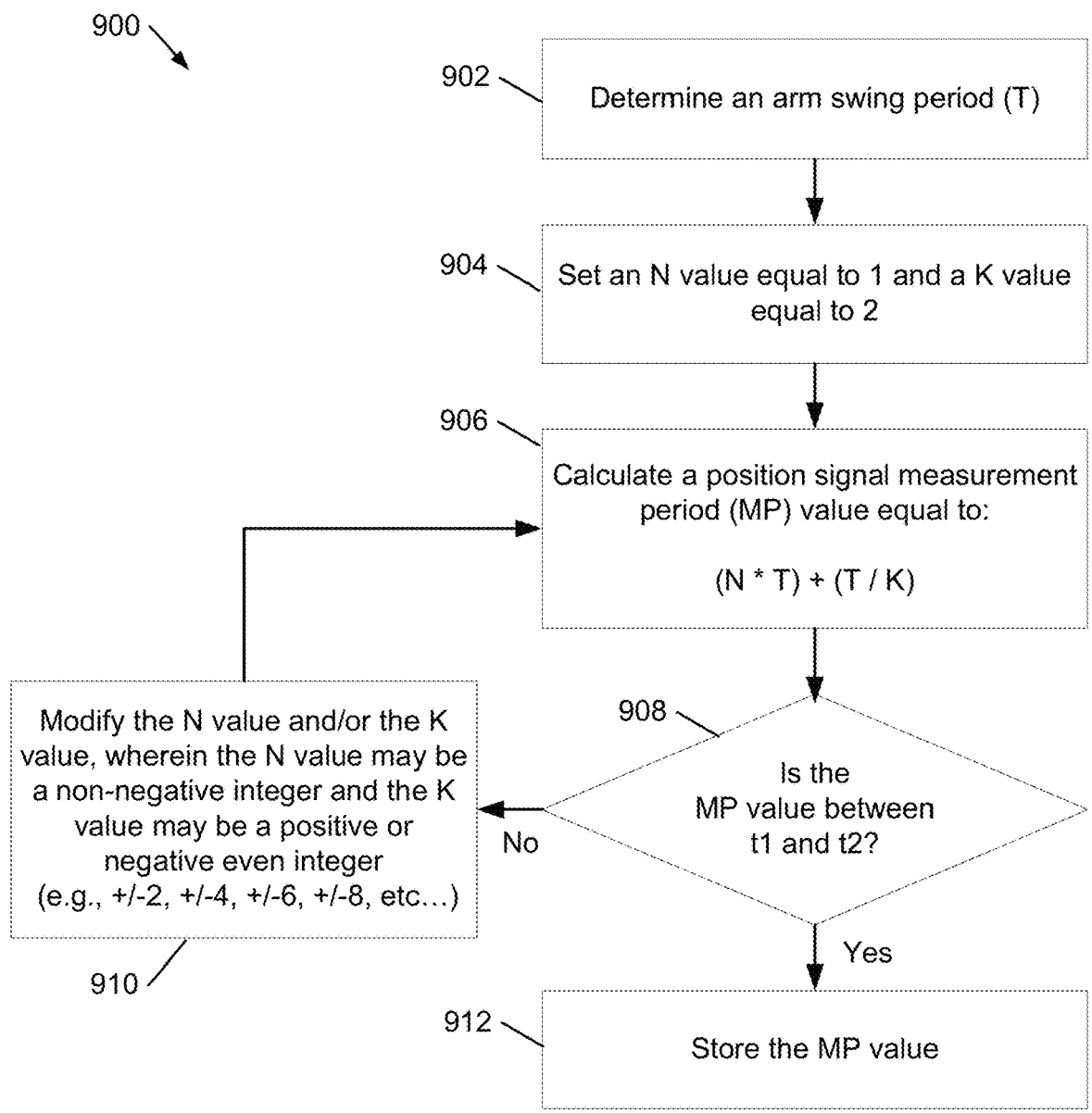
FIG. 9 is a flow diagram of a process for storing a position signal measurement period value.

Referring to FIG. 9, with further reference to FIGS. 1-6, a process 900 for storing a position signal measurement period value includes the stages shown. The process 900 is, however, an example only and not limiting. The process 900 can be altered, e.g., by having stages added, removed, rearranged, combined, performed concurrently, and/or having single stages split into multiple stages. The example discussed here is an example only, and not limiting of the mobile device 100.

At stage 902, the mobile device 100 is configured to determine an arm swing period (T). The accelerometer(s) 140 may detect the arm swing via the change in direction at the opposing ends of the swing. The accelerometers 140 and the processor 111 are a means for determining an arm swing period. A pedometer or other motion sensor may also be used to detect foot falls (e.g., T=(foot falls)/2). A gyroscope in the mobile device 100 may be configured to detect changes in direction at the opposing ends of the arm swing arc 304. The GNSS receiver 170 may be configured to oversample the Doppler in the SPS signal for a short period of time, and use the average Doppler as the velocity and the peaks in oscillation around the average to detect the periodicity of the arm swing. The intersection of the detected oscillating waveform with the average to detect the periodicity of the arm swing. The arm sing period T may be stored in memory unit 160 for use in calculating a position signal measurement period at stage 906.

At stage 904, the mobile device 100 is configured to set an N value equal to 1 and a K value equal to 2. The processor 111 is a means for setting the N and K values. The values for N and K may be included in a software application loaded into memory 160, or may be received via the network 225.

At stage 906, the mobile device 100 is configured to calculate a position signal measurement period (MP) value. The processor 111 is a means for calculating an MP value. In an example, the processor 111 is configured to determine a solution to the equation:

$$MP = (N*T) + (T/K);$$

where:
T is the period determined at stage 902;
N has an initial value of 1; and
K has an initial value of 2.

At stage 908, the mobile device 100 is configured to determine if the MP value is between a t1 value and a t2 value. In an example, the process 900 attempt to find a value for MP that is closest to 1 second by iterating through differing values of N and K. In this example, the values for t1 and t2 may be 0.9 and 1.3 respectively. The 1 second target and the corresponding t1 and t2 values, however, are examples based on hardware performance of a particular mobile device 100, and are not limitations. Other desired values (e.g., 0.8, 1.2, 1.6, 2.1 seconds) may be used based on corresponding hardware and software configurations in other mobile devices. If the desired MP value is not calculated at stage 906, the process 900 may iterate the MP value calculation through stage 910 until a desired MP is realized.

At stage 910, the mobile device 100 is configured to modify the N value and/or the K value, wherein the N value may be a non-negative integer (e.g., 0, 1, 2, 3 . . . ) and the K value may be a positive or negative even integer (e.g., +/−2, +/−4, +/−6, +/−8, etc. . . . ). The processor 111 is a means for modifying the N and K values. The order of modification of the N and/or K values is not a limitation and may be varied based on system performance. For example, a larger value for K will require a longer time to complete all of the corresponding 180 degree pairs as illustrated in FIGS. 6A, 6B and 6C. For example, the second graph 610 is based on a value of K=6 and more than six cycles are required to complete all complementary pairs. The new values for N and/or K are provided to stage 906 and a new MP value is evaluated at stage 908. If the desired MP value is obtained, the mobile device 100 is configured to store the MP value at stage 912. The processor 111 and memory unit 160 are a means for storing the MP value. The MP value may be output to other application, such as the GNSS receiver 170 for position signal acquisition.

Reference throughout this specification to "one example", "an example", "certain examples", or "exemplary implementation" means that a particular feature, structure, or characteristic described in connection with the feature and/or example may be included in at least one feature and/or example of claimed subject matter. Thus, the appearances of the phrase "in one example", "an example", "in certain examples" or "in certain implementations" or other like phrases in various places throughout this specification are not necessarily all referring to the same feature, example, and/or limitation. Furthermore, the particular features, structures, or characteristics may be combined in one or more examples and/or features.

Some portions of the detailed description included herein are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular operations pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining" or the like refer to actions or processes of a specific apparatus, such as a special purpose computer, special purpose computing apparatus or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Wireless communication techniques described herein may be in connection with various wireless communications networks such as a wireless wide area network ("WWAN"), a wireless local area network ("WLAN"), a wireless personal area network (WPAN), and so on. The term "network" and "system" may be used interchangeably herein. A WWAN may be a Code Division Multiple Access ("CDMA") network, a Time Division Multiple Access ("TDMA") network, a Frequency Division Multiple Access ("FDMA") network, an Orthogonal Frequency Division Multiple Access ("OFDMA") network, a Single-Carrier Frequency Division Multiple Access ("SC-FDMA") network, or any combination of the above networks, and so on. A CDMA network may implement one or more radio access technologies ("RATs") such as cdma2000, Wideband-CDMA ("W-CDMA"), to name just a few radio technologies. Here, cdma2000 may include technologies implemented according to IS-95, IS-2000, and IS-856 standards. A TDMA network may implement Global System for Mobile Communications ("GSM"), Digital Advanced Mobile Phone System ("D-AMPS"), or some other RAT. GSM and W-CDMA are described in documents from a consortium named "3rd Generation Partnership Project"

("3GPP"). Cdma2000 is described in documents from a consortium named "3rd Generation Partnership Project 2" ("3GPP2"). 3GPP and 3GPP2 documents are publicly available. 4G Long Term Evolution ("LTE") communications networks may also be implemented in accordance with claimed subject matter, in an aspect. A WLAN may comprise an IEEE 802.11x network, and a WPAN may comprise a Bluetooth network, an IEEE 802.15x, for example. Wireless communication implementations described herein may also be used in connection with any combination of WWAN, WLAN or WPAN.

In another aspect, as previously mentioned, a wireless transmitter or access point may comprise a cellular transceiver device, utilized to extend cellular telephone service into a business or home. In such an implementation, one or more mobile devices may communicate with a cellular transceiver device via a code division multiple access ("CDMA") cellular communication protocol, for example.

Techniques described herein may be used with an SPS that includes any one of several GNSS and/or combinations of GNSS. Furthermore, such techniques may be used with positioning systems that utilize terrestrial transmitters acting as "pseudolites", or a combination of SVs and such terrestrial transmitters. Terrestrial transmitters may, for example, include ground-based transmitters that broadcast a PN code or other ranging code (e.g., similar to a GPS or CDMA cellular signal). Such a transmitter may be assigned a unique PN code so as to permit identification by a remote receiver. Terrestrial transmitters may be useful, for example, to augment an SPS in situations where SPS signals from an orbiting SV might be unavailable, such as in tunnels, mines, buildings, urban canyons or other enclosed areas. Another implementation of pseudolites is known as radio-beacons. The term "SV", as used herein, is intended to include terrestrial transmitters acting as pseudolites, equivalents of pseudolites, and possibly others. The terms "SPS signals" and/or "SV signals", as used herein, is intended to include SPS-like signals from terrestrial transmitters, including terrestrial transmitters acting as pseudolites or equivalents of pseudolites.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter.

The terms, "and", "or", and "and/or" as used herein may include a variety of meanings that also are expected to depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic in the singular or may be used to describe a plurality or some other combination of features, structures or characteristics. Though, it should be noted that this is merely an illustrative example and claimed subject matter is not limited to this example.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein.

Therefore, it is intended that claimed subject matter not be limited to the particular examples disclosed, but that such claimed subject matter may also include all aspects falling within the scope of appended claims, and equivalents thereof.

For an implementation involving firmware and/or software, the methodologies may be implemented with modules (e.g., procedures, functions, and so on) that perform the functions described herein. Any machine-readable medium tangibly embodying instructions may be used in implementing the methodologies described herein. For example, software codes may be stored in a memory and executed by a processor unit. Memory may be implemented within the processor unit or external to the processor unit. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or code on a computer-readable storage medium. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage, semiconductor storage, or other storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

In addition to storage on computer-readable storage medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

What is claimed is:

1. A mobile device comprising:
  a memory unit;
  a global navigation satellite system (GNSS) receiver;
  a sensor configured to detect an arm swing motion;
  one or more processing units operably coupled to the memory unit, the GNSS receiver, and the sensor, and configured to:
    determine an arm swing period (T);
    set an N value equal to 1 and a K value equal to 2;

calculate a position signal measurement period (MP) value equal to $(N*T)+(T/K)$ store the MP value in the memory unit if the MP value is between a t1 value and t2 value;

modify the N value or the K value and iterate the MP calculation, wherein the N value is a non-negative integer and the K value is a positive or negative even integer if the MP value is not between the t1 value and the t2 value; and acquire position signals with the GNSS receiver at an interval equal to the MP value stored in the memory unit; and determine a location of the mobile device based at least in part on the position signals acquired at two or more intervals.

2. The mobile device of claim 1 wherein the one or more processing units is further configured to determine a velocity of the mobile device based on the position signals acquired at two or more intervals.

3. The mobile device of claim 1 wherein the sensor configured to detect the arm swing motion includes one or more accelerometers.

4. The mobile device of claim 1 wherein the sensor configured to detect the arm swing motion is configured to detect a foot fall rate, and the one or more processing units are configured to determine the arm swing period (T) as the foot fall rate divided by 2.

5. The mobile device of claim 1 wherein the one or more processing units is configured to determine the arm swing period (T) and store a corresponding MP value periodically.

6. The mobile device of claim 1 wherein the t1 value is 0.9 seconds and the t2 value is 1.3 seconds.

7. A non-transitory processor-readable storage medium comprising processor-readable instructions configured to cause one or more processors to determine a location of a mobile device in the presence of arm swing, the instructions comprising:

code for determining an arm swing period (T);

code for setting an N value equal to 1 and a K value equal to 2;

code for calculating a position signal measurement period (MP) value equal to $(N*T)+(T/K)$ code for storing the MP value in memory if the MP value is between a t1 value and t2 value;

code for iterating the MP calculation by modifying the N value or the K value, wherein the N value is a non-negative integer and the K value is a positive or negative even integer if the MP value is not between the t1 value and the t2 value;

code for acquiring position signals in a GNSS receiver at an interval equal to the MP value stored in memory; and code for determining the location of the mobile device based on the position signals acquired at two or more intervals.

8. The non-transitory processor-readable storage medium of claim 7 further comprising code for determining a velocity of the mobile device based on the position signals acquired at two or more intervals.

9. The non-transitory processor-readable storage medium of claim 7 wherein the code for determining the arm swing period (T) is based on one or more accelerometers.

10. The non-transitory processor-readable storage medium of claim 7 further comprising code for detecting a foot fall rate and determining the arm swing period (T) as the foot fall rate divided by 2.

11. The non-transitory processor-readable storage medium of claim 7 further comprising code for periodically determining and storing the arm swing period (T).

12. The non-transitory processor-readable storage medium of claim 7 wherein the t1 value is 0.9 seconds and the t2 value is 1.3 seconds.

13. A method of determining a location of a user with a mobile device in the presence of arm swing, comprising:

determining an arm swing period (T);

setting an N value equal to 1 and a K value equal to 2;

calculating a position signal measurement period (MP) value equal to $(N*T)+(T/K)$ storing the MP value in memory if the MP value is between a t1 value and t2 value;

iterating the MP calculation by modifying the N value or the K value, wherein the N value is a non-negative integer and the K value is a positive or negative even integer if the MP value is not between the t1 value and the t2 value;

acquiring position signals at an interval equal to the MP value stored in memory; and determining the location of the mobile device based at least in part on the position signals acquired at two or more intervals.

14. The method of claim 13, further comprising:

determining a velocity of the mobile device based on the position signals acquired at two or more intervals.

15. The method of claim 13, wherein determining the arm swing period (T) comprises measuring the arm swing period using one or more accelerometers.

16. The method of claim 13, wherein determining the arm swing period (T) comprises:

detecting a foot fall rate; and determining the arm swing period (T) as the foot fall rate divided by 2.

* * * * *